Aug. 3, 1954
K. H. HACHMUTH
2,685,556
LIQUID-LIQUID SOLVENT EXTRACTION
AND AZEOTROPIC DISTILLATION
Filed April 16, 1951
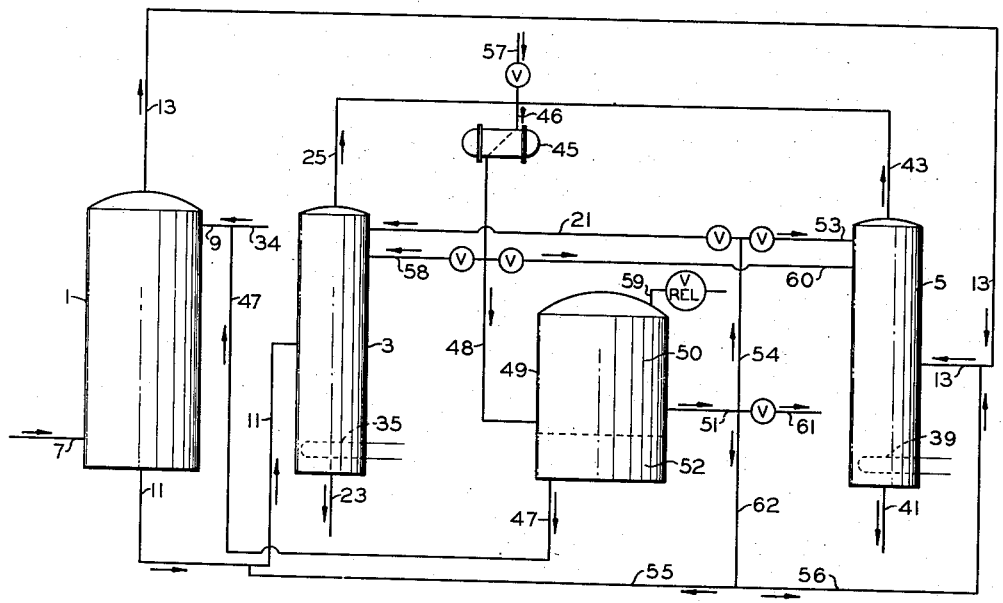
INVENTOR.
K. H. HACHMUTH
BY
ATTORNEYS Patented Aug. 3, 1954

2,685,556

UNITED STATES PATENT OFFICE 2,685,556

LIQUID-LIQUID SOLVENT EXTRACTION AND AZEOTROPIC DISTILLATION

Karl H. Hachmuth, Bartlesville, Okla., assignor to Phillips Petroleum Company, a corporation of Delaware Application April 16, 1951, Serial No. 221,264

15 Claims. (Cl. 196—14.26)

This invention relates to a solvent extraction process. In one aspect it relates to a process for recovering solvent from an extract phase in an extract phase distillation column. In another aspect it relates to a method for the separation of solvent as an overhead product free from extract oil in an extract distillation column and for the separation of solvent as an overhead product free from raffinate oil in a raffinate distillation column.

This application is a continuation-in-part of my copending application, Serial No. 116,175, filed September 16, 1949, now abandoned.

When furfural is used as an extraction solvent in the separation of aromatic from non-aromatic gas-oil boiling range hydrocarbons, two liquid phases are obtained. One phase, termed raffinate, contains the non-aromatic hydrocarbons with a small amount of furfural in solution. Since furfural is specifically heavier than such hydrocarbon oils the raffinate phase will accumulate in the top of the separation zone. The other liquid phase, termed the extract, accumulates in the bottom of the vessel and this phase contains the aromatic hydrocarbons in solution in furfural. One common method for separation of the furfural from the raffinate phase is by distillation in which the furfural is withdrawn from the top of the distillation vessel as a vaporous overhead product. This furfural vapor may be condensed and returned to the extraction vessel as a portion of the solvent. The raffinate oil is withdrawn as bottoms from the distillation vessel. The same general distillation process is frequently used for the recovery of the furfural from the extract phase in which the extract oil is withdrawn from the distillation column as bottoms and the furfural taken overhead as vapor. This furfural vapor is likewise condensed and recycled as the remaining portion of the recycle solvent to the extraction column.

When distilling the extract from the furfural solvent if the extract contains aromatic hydrocarbons boiling, for example, between 350° and 450° F., a very significant amount, sometimes as much as 10 per cent, of these low-boiling aromatic hydrocarbons has heretofore always passed overhead in the extract distillation column with the furfural vapors. As a result of the fractionation the concentration of the furfural is expected to approach 100 per cent in the uppermost portion of the extract recovery column. However, in the presence of high concentrations of furfural the volatility of small proportions of aromatic extract oil is greatly enhanced, and for this reason, the lower boiling portion of such an extract oil tends to vaporize at a faster rate than would be expected. In other words, the activity of the low-boiling portion of the extract oil in the presence of a high concentration of furfural is high and for this reason some extract oil actually passes overhead from the extract oil distillation column with the furfural vapors, even when the very best known commercial distillation columns are employed. Upon condensation of the overhead vapors, this extract oil also condenses and remains in solution in the furfural. Upon introduction of this condensate into the original extraction column, aromatic oil is introduced or recycled into this column. A large portion of the aromatic oil thus recycled is extracted from the solvent by the high concentration of raffinate in the upper end of the column and leaves the column in solution with the raffinate from which it was originally extracted. This, of course, constitutes a serious loss in the overall efficiency of separation.

This abnormal behavior of the extract oil in distilling overhead with the extractant furfural is also a pattern of what takes place in the raffinate distillation column. In distilling the furfural from the raffinate hydrocarbons of the raffinate phase, the same general considerations as regarding the apparent increase in volatility of the low boiling portions of the raffinate oil in the presence of high concentrations of furfural in the upper space of the column causes an amount sometimes as great as 10 per cent of these low boiling raffinate hydrocarbons to pass overhead in the raffinate distillation column with the furfural vapors.

My process provides a method for the elimination of both the extract oil hydrocarbons and the raffinate oil hydrocarbons from the respective distillation column furfural vapors.

The inclusion of extract or aromatic hydrocarbons in the overhead furfural vapors adds extract hydrocarbons in the extraction column with the solvent at about the point of removal of the raffinate phase and, as mentioned hereinabove, this procedure causes some aromatic hydrocarbons to be included with the raffinate phase as it is removed from the extraction column. This operation results in contamination of the raffinate oil and at the same time a loss of extract oil.

However, when raffinate hydrocarbons are distilled overhead with the furfural vapors in the raffinate recovery column these raffinate hydrocarbons are likewise reintroduced into the extraction column at about the point of raffinate outlet. Upon addition of raffinate hydrocarbons at this point an extra load is placed upon the raffinate recovery column while there is no contamination of the raffinate phase with hydrocarbons not desired to be in the raffinate oil.

I have found that the activity or the relative volatility of the low boiling extract oil can be suppressed in the upper portion of the extract recovery column by distilling the extract phase in the presence of some paraffinic naphtha. I have also found that the activity or the relative volatility of a low boiling raffinate oil can be suppressed in the upper portion of the raffinate recovery column by distilling the raffinate phase in the presence of some paraffinic naphtha.

By the term "naphtha" or "paraffinic naphtha" as used throughout this specification and claims I mean a naphtha of the herein specified boiling point characteristics containing preferably paraffinic hydrocarbons but may contain cycloparaffinic, olefinic and some aromatic hydrocarbons. Available refinery naphthas having the desired boiling point characteristics, such as straight run or cracked may be used providing the latter is not too highly degraded.

An object of my invention is to devise a unitary process for the separation of aromatic hydrocarbon constituents from non-aromatic hydrocarbon constituents in cracked gas oils by the use of furfural as a solvent.

Another object of my invention is to devise such a process in which low-boiling ends of the aromatic constituents of the cracked gas-oil are prevented from passing overhead with the furfural vapors from an extract distillation column.

Another object of my invention is to devise a process in which low boiling ends of the raffinate oil of a cracked gas-oil are prevented from passing overhead with the furfural vapors from a raffinate distillation column.

Yet another object of my invention is to devise a solvent extraction process in which solvent is recovered from the extract phase and from the raffinate phase without contamination with extract or raffinate hydrocarbons for recycling into the extraction operation.

Still other objects and advantages of my process will be obvious to those skilled in the art upon reading the following disclosure which, taken with the accompanying drawing, forms a part of this specification.

In the drawing the figure represents diagrammatically one form of apparatus in which the process of my invention may be practiced.

In the drawing, reference numeral 1 refers to a solvent extraction column of conventional type. Reference numerals 3 and 5 refer to distillation columns in which the extract phase and the raffinate phase, respectively, are distilled for isolation of the extract oil and the raffinate oil. Vessel 49 is an accumulator tank in which overhead vapors from distillation columns 3 and 5, condensed in condenser 45, are received as condensate. The two distillation columns 3 and 5 are equipped with reboiler coils 35 and 39, respectively. Inlet and outlet connections to these several vessels with interconnecting pipes will be identified in the following paragraphs which describe the operation of my process.

Furfural from vessel 49 flows through a pipe 47, through a solvent inlet pipe 9, into the extraction vessel 1. The gas oil to be separated into constituent parts is introduced into the extraction vessel through a line 7 situated at a point near the bottom of this vessel. Since the gas-oil is specifically lighter than the furfural, the latter tends to flow downward and the gas-oil to flow upward in a countercurrent manner in the extraction vessel. This vessel may contain any suitable type of liquid-liquid contacting equipment desired. The only requirement is that the contacting or packing apparatus be of such nature as to promote intimate and efficient liquid-liquid contacting. The portion of the gas-oil which is less aromatic in nature will be rejected by the furfural and will remain as a separate and distinct oil phase. This oil rises to the top of the furfural and is withdrawn through an overhead line 13. This overhead oil or raffinate phase is passed through the line 13 and is introduced into about a midpoint of the raffinate recovery still 5. In this column sufficient reboil heat is added by means of coil 39 to separate the furfural from the raffinate oil. The furfural vapors leave the top of this column through an overhead line 43. These vapors pass from line 43 through a line 46 and are condensed in a condenser 45. The condensate passes on through a line 48 into the condensate accumulator 49. A sufficient amount of this overhead condensate as required to reflux the distillation column 5 may be bypassed from line 48 through line 60 by opening the valve therein and introducing condensate into the top portion of the column 5. The condensate from the condenser 45 not required for refluxing still 5 may be passed on through line 48 into the receiver 49.

In accordance with my invention the condensate in vessel 49 separates into two liquid layers, the upper layer 50 consists mainly of paraffinic naphtha with some furfural in solution and the lower layer 52 consists mainly of furfural but also contains some paraffinic naphtha in solution.

Paraffinic naphtha containing some furfural in solution is withdrawn from vessel 49 through a line 51 and at least a portion is passed through lines 62, 56, and 13 into the distillation column 5. In this inlet line 13 the paraffinic naphtha passed therethrough is mixed with the raffinate phase also passing through line 13 so that the two materials in process may be introduced into the column 5 at the same point. The presence of this paraffinic naphtha assists in reducing the azeotrope forming tendencies of the furfural with the low boiling constituents of the raffinate oil in the upper trays of the column where the furfural is present in relatively high concentration. In this manner the raffinate oil hydrocarbons are prevented from passing overhead with the furfural and these raffinate hydrocarbons, accordingly, become concentrated in the lower section of this vessel to be removed through a bottoms drawoff line 41 for such disposal as desired. The furfural and paraffinic naphtha vapors are taken overhead from this column through line 43 and follow the cycle hereinbelow described.

In another embodiment all or at least a portion of paraffinic naphtha from line 51 may be passed through a line 54 and on through a line 53 into the upper portion of still 5. While this latter procedure for the introduction of the paraffinic naphtha does add paraffinic naphtha to the top of the column at a point near the top more naphtha is required to effect the separation between the furfural and the low boiling raffinate hydrocarbons than when the paraffinic naphtha is introduced into the column at about a midpoint, as through line 13, as described above. This latter point of addition of the naphtha is the preferred point of addition of the naphtha to the raffinate still 5.

The extract phase is passed from the bottom of the extraction column 1 through a line 11 into about the midpoint of the extract recovery column 3. This extract recovery column 3 is operated in about the same manner as the raffinate recovery column 5. Sufficient reboil heat is added to column 3 by reboiler 35 that the extract phase is separated into an extract oil bottoms and a solvent overhead product. In this column it has been found that among the upper trays of the column wherein the concentration of the furfural is relatively high the activity of the low boiling constituents of extract oil is abnormally high and some of these low boiling constituents find their way out of the column with the furfural through the overhead vapor line 25. To prevent the passage overhead from column 3 of any of the extract hydrocarbons I take a portion of the paraffinic naphtha flowing through line 62 and pass this portion of naphtha through a line 55 and add the same to the extract phase flowing through line 11. This mixture of extract phase and paraffinic naphtha is introduced into the column 3 as feed. The presence of an amount of paraffinic naphtha operates to suppress the activity or the relative volatility of the lower boiling extract hydrocarbons and prevents these hydrocarbons from passing overhead with the furfural vapors. Accordingly, all of the extract oil finds its way to the bottom of column 3 and is accordingly removed through the drawoff line 23 for such disposal as desired. The overhead vapors consisting of furfural and paraffinic naphtha flowing through line 25 are passed through line 46 with the overhead vapors from the raffinate column 5 and these combined vapors are condensed in the condenser 45. The condensate produced therein is passed through line 48 into the receiver vessel 49 as described above in the operation of the raffinate still 5. If it is desired to reflux the top of the extract recovery vessel 3 a portion of the condensate from condenser 45 may be passed from line 48 through a line 52 by opening the valve therein and passing this portion of condensate into the upper portion of the still 3. That amount of condensate from the condenser 45 not required for the refluxing of columns 3 and 5 is the condensate passed on through line 43 into the receiver vessel 49.

If as explained above in relation to the raffinate column 5, it is desired to add some paraffinic naphtha to the top portion of the extract recovery column 3 some of the naphtha flowing through line 54 may be bypassed from line 53 and passed through a line 21 by opening the valve therein and into the top of the column 3. The operation of the paraffinic naphtha from the high point of entry into the column is substantially the same in this column as in the raffinate column 5, that is, more paraffinic naphtha is required to effect a separation between the furfural and the low boiling extract hydrocarbons than when the paraffinic naphtha is introduced into the column at about a midpoint. Accordingly, a preferred method of operation is to add the paraffinic naphtha at about a midpoint of the extract recovery column 3. This naphtha may be introduced into the column in the same line 11 as the extract phase or this naphtha may be introduced through a separate line at about the same point vertically in the column. The naphtha may also be added to the raffinate recovery column through a separate line at about the level of the raffinate oil feed line 13.

Makeup furfural extractant may be introduced into the system through a line 34 from a source, not shown, and as required. Makeup paraffinic naphtha may be introduced into the system through a line 57 from a source, not shown. In case paraffinic naphtha accumulates in the accumulator vessel 49 at a rate more rapid than is required in the distillation operations in vessels 3 and 5 the excess paraffinic naphtha may be removed from the system through a line 61. This paraffinic naphtha removed through line 61 may be washed with water for recovery of the furfural and the furfural recovered from the wash water reintroduced into the system through line 34 as required. In like manner the recovered paraffinic naphtha may be introduced into the system through the aforesaid line 57 as required. In place of separating the furfural from the removed naphtha by the just mentioned water washing operation, the naphtha-furfural mixture may be reintroduced into the system through the naphtha makeup line 57 as required.

The cracked gas oil which may be separated into aromatic and non-aromatic portions according to my process may have an initial boiling point in the region of 350° F. The end point of the oil may be that dictated by the desired use for the oil. While some of the aromatic hydrocarbon content of the extract oil vaporizes abnormally in the presence of the high concentration of the furfural in the extract recovery column, it is the fraction boiling normally from about 350° to 450° F. which distills overhead with the furfural. This 350° to 450° F. boiling fraction of aromatic hydrocarbons is normally very difficult to separate from the furfural. Hydrocarbons boiling at temperatures much below 350° F. will not normally be included in gas-oil fractions. It is also the paraffinic hydrocarbons boiling from about 350 to 450° F. from the raffinate oil which pass overhead with the furfural.

The paraffinic naphtha which I have found useful for this aromatic vapor and paraffinic vapor suppression may possess about a 50° F. boiling range, and at the same time, have an average boiling point of between 300° and 350° F. A naphtha having an average boiling point of about 325° F. is satisfactory. The maximum boiling point of this naphtha should preferably not be higher than the minimum boiling point of the gas-oil.

It is believed that such a system including furfural and 350° to 450° F. boiling point aromatic or non-aromatic hydrocarbons does exhibit some azeotrope-forming tendencies and the presence of the paraffinic naphtha dilutes the furfural sufficiently as to eliminate or reduce these tendencies to such an extent that no, or substantially no extract or raffinate material passes overhead.

The apparatus used in the carrying out of the process of my invention may, for the most part, be constructed of materials available commercially. Such auxiliary apparatus as pumps, valves, pressure gauges, or recording apparatus, temperature indicating or recording apparatus, pressure or temperature controllers, or flow controllers, are not shown nor described for purposes of simplicity. The necessity for the use and the installation and operation of such auxiliary apparatus is well understood by those skilled in the art. It will be realized that the operating conditions of my process may be varied at will, almost, and yet remain within the intended spirit and scope of the invention.

I claim:

1. In a process for the separation by distillation of a mixture comprising furfural and a higher boiling liquid hydrocarbon component wherein the liquid hydrocarbon of higher boiling point possesses azeotrope-forming tendencies with the furfural and some of said higher boiling component passes overhead with the furfural, the method of carrying out a distillation operation to separate the furfural from said higher boiling component comprising, in combination, the steps of introducing only said mixture of liquids and a narrow boiling range liquid paraffinic naphtha having an average boiling point near but below the minimum boiling point of said higher boiling point liquid hydrocarbon component into a distillation zone and therein subjecting said mixture of liquids and said naphtha to distillation conditions, removing overhead only vapors of furfural and naphtha from said zone, and removing liquid bottoms from a lower portion of said zone.

2. The method of claim 1 wherein the mixture separated by distillation comprises an extract phase resulting from the extraction of a cracked gas oil boiling above 350° F. with furfural.

3. The method of claim 1 wherein the mixture separated by distillation comprises a raffinate phase resulting from the extraction of a cracked gas oil boiling above 350° F. with furfural.

4. The method of claim 2 wherein the paraffinic naphtha has a boiling range of 50° F. and an average boiling point between the limits of 300° and 350° F.

5. The method of claim 3 wherein the paraffinic naphtha has a boiling range of 50° F. and an average boiling point between the limits of 300° and 350° F.

6. In a process for the separation by distillation of a mixture comprising furfural and a higher boiling liquid hydrocarbon component wherein the liquid hydrocarbon of higher boiling point possesses azeotrope-forming tendencies with the furfural and some of said higher boiling component passes overhead with the furfural, the method of carrying out a distillation operation to separate the furfural from said higher boiling hydrocarbon component comprising, in combination, the steps of introducing only said mixture of liquids into a distillation zone, introducing at the feed level and above a narrow boiling range liquid paraffinic naphtha having an average boiling point near but below the minimum boiling point of said higher boiling liquid hydrocarbon component, and therein subjecting said mixture and naphtha to distillation conditions, removing overhead only vapors of furfural and naphtha from said zone, and removing liquid bottoms from a lower portion of said zone.

7. The method of claim 6 wherein the mixture separated by distillation comprises an extract phase resulting from the extraction of a cracked gas-oil boiling above 350° F. with furfural.

8. The method of claim 6 wherein the mixture separated by distillation comprises a raffinate phase resulting from the extraction of a cracked gas-oil boiling above 350° F. with furfural.

9. The method of claim 7 wherein the paraffinic naphtha has a boiling range of 50° F. and an average boiling point between the limits of 300° and 350° F.

10. The method of claim 8 wherein the paraffinic naphtha has a boiling range of 50° F. and an average boiling point between the limits of 300° and 350° F.

11. A process comprising the steps of solvent extracting a gas-oil having a minimum boiling point above 350° F. with only furfural to produce a raffinate phase and an extract phase, separating the raffinate phase from the extract phase, subjecting the raffinate phase to distillation conditions and separating raffinate oil from solvent, recycling the separated solvent to the extraction step and removing the raffinate oil as one product of the process, subjecting the extract phase to distillation conditions in the presence of only a paraffinic naphtha having a maximum boiling range of 50° F. and an average boiling point between 300° and 350° F. and separating extract oil as bottoms from an overhead product of only a furfural-naphtha mixture, separating this latter mixture into a first component comprising furfural and a second component comprising naphtha, recycling said first component into the extraction step as the extractant furfural and introducing said second component into said extract distillation step as said paraffinic naphtha, and recovering said extract oil as the second product of the process.

12. In the process of claim 11 introducing said paraffinic naphtha into the extract distillation operation at a midpoint and above of the distillation column.

13. The method of claim 11 wherein the furfural-naphtha separation step comprises condensing said furfural-naphtha mixture and separating by decantation from this condensate a first liquid phase as said first component comprising furfural and a second liquid phase as said second component comprising naphtha.

14. A process comprising the steps of solvent extracting a gas-oil having a minimum boiling point above 350° F. with only furfural to produce a raffinate phase and an extract phase, separating the raffinate phase from the extract phase, subjecting the raffinate phase to distillation conditions in the presence of only a paraffinic naphtha having a maximum boiling range of 50° F. and an average boiling point between 300° and 350° F. and separating raffinate oil from a first mixture of only furfural and naphtha, subjecting the extract phase to distillation conditions in the presence of only an additional quantity of said paraffinic naphtha and separating extract oil from a second mixture of only furfural and naphtha, combining the first and second mixtures of furfural and naphtha, separating this combined furfural and naphtha into a first component of furfural and a minor amount of naphtha in solution and a second component of naphtha and a minor amount of furfural in solution, recycling said first component into the extraction step as the extractant furfural and introducing a portion of said second component into said extract distillation step as said additional quantity of paraffinic naphtha, introducing the remaining portion of the second component into said raffinate distillation step as the first mentioned paraffinic naphtha, and recovering said raffinate oil and said extract oil as products of the process.

15. In the method of claim 4 separating by decantation combined furfural-naphtha mixture from a first liquid phase as said first component comprising furfural and a minor amount of naphtha in solution and a second liquid phase as said second component comprising naphtha and a minor amount of furfural in solution.

References Cited in the file of this patent

UNITED STATES PATENTS

| Number | Name | Date |
| --- | --- | --- |
| 2,139,240 | McFarland | Dec. 6, 1938 |
| 2,209,150 | Byrns | July 23, 1940 |
| 2,216,932 | Atkins | Oct. 8, 1940 |
| 2,567,172 | Arnold et al. | Sept. 11, 1951 |